Dec. 8, 1931. C. STEIN 1,835,677

FURNACE

Filed March 8, 1928

INVENTOR
Charles Stein
BY
ATTORNEYS

Patented Dec. 8, 1931

1,835,677

UNITED STATES PATENT OFFICE

CHARLES STEIN, OF PARIS, FRANCE, ASSIGNOR TO SOCIETE ANONYME DES APPAREILS DE MANUTENTION ET FOURS STEIN, OF PARIS, FRANCE, A CORPORATION OF FRANCE

FURNACE

Application filed March 8, 1928, Serial No. 260,110, and in France March 21, 1927.

This invention relates particularly to a furnace operated by means of lean combustible gases such as blast furnace gas and aims to enable a relatively high temperature to be maintained in the heating chamber, notwithstanding the fact that the gas may be so poor as not to be capable of producing such temperatures under ordinary conditions or operation.

In accordance with the present invention, a portion of the lean gas supplied is diverted from passage to the main heating chamber, and burned separately to act as a source of heat for an air preheater, thereby producing air preheated to such temperature that, when mixed in the main heating chamber with the lean gas which is fed into such chamber, the temperature of the gases of combustion is sufficient to maintain a relatively high temperature in the main heating chamber. For example, with the use of blast furnace gas under ordinary conditions of operation, it is impossible to obtain a heat high enough for billet heating or similar rolling mill operations and the present invention will enable heating temperatures ranging up to 2500° F. or more to be obtained, thus making lean gases available for furnaces where temperatures of the above range are desired.

Further objects and advantages of the invention will be in part obvious and in part specifically pointed out in the description hereinafter contained which, taken in conjunction with the accompanying drawings, discloses a furnace adapted to be operated in accordance therewith. It should be understood, however, that such disclosure is merely illustrative of the principles of the invention. In the drawings—

Figure 3:
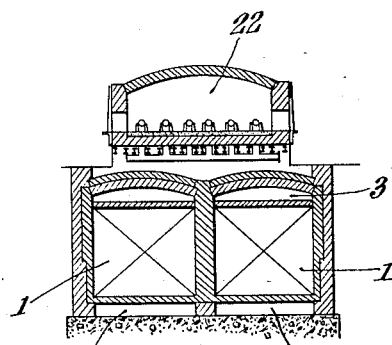
Fig. 3 is a section similar to Fig. 2 but taken on line 3—3 of Fig. 1.
Figure 4:
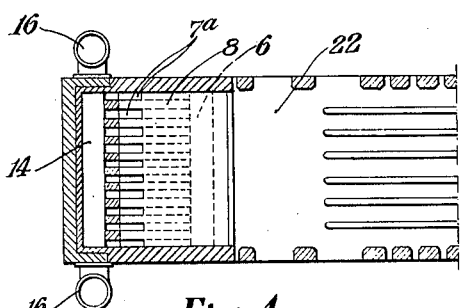
Fig. 4 is a horizontal section taken on line 4—4 of Fig. 1.

Referring to the drawings, a recuperator 1 of suitable construction is shown as disposed underneath the entrance end of the main heating chamber 22. The detailed construction of the recuperator is not essential but it may be constructed, for example, as shown in United States Patent No. 1,404,721, issued January 24, 1922, entitled "Recuperator". In this type of recuperator the air to be preheated enters at the bottom where it may be regulated by dampers 2. The air rises vertically through the recuperator as it takes up heat and is collected in a gathering chamber 3 at the top of the recuperator. The illustrated form of the invention, as will be apparent from Fig. 3, shows twin recuperators disposed side by side.

Figure 1:
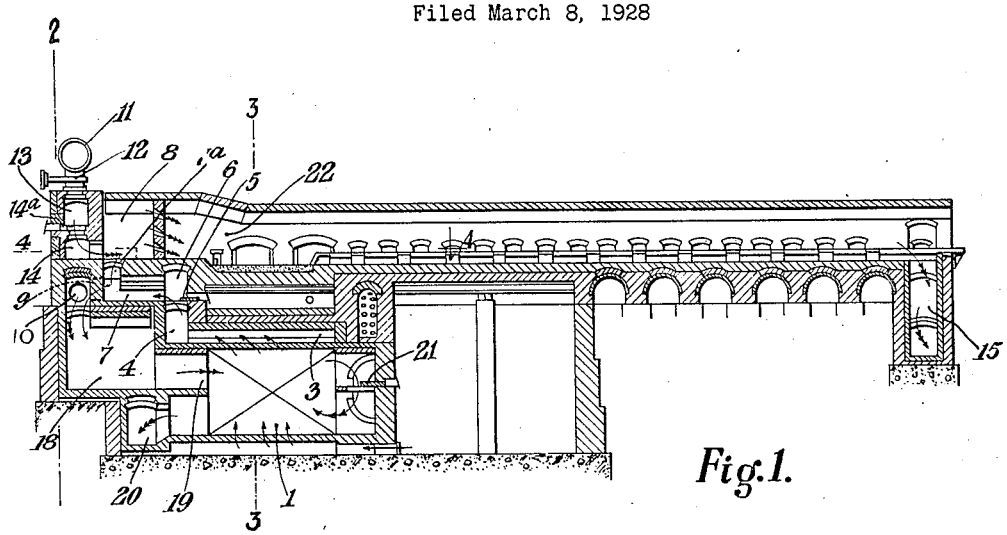
Fig. 1 is a central vertical sectional view of a furnace constructed to operate in accordance with the invention.

From the gathering chamber or chambers 3, the preheated air passes upwardly from a transverse conduit 4 to a similar conduit 6, the distribution of the flow of preheated air between the two conduits being controlled by dampers 5 (Fig. 1) disposed across the furnace. The preheated air then passes through a passageway 7, disposed adjacent an auxiliary combustion chamber 18 hereinafter described, and ports 7a permit the preheated air to pass from this into the main combustion chamber 22, or into a mixing chamber 8 associated therewith.

Figure 2:
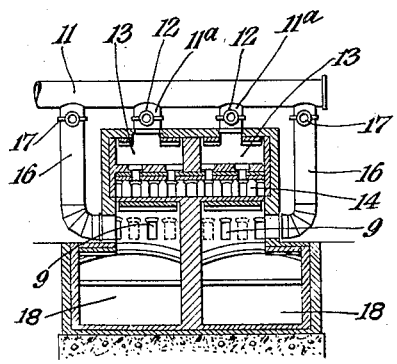
Fig. 2 is a transverse vertical section on line 2—2 of Fig. 1.

If desired, a portion of the preheated air from passageway 7 may be directed through ports 9 to mix with the lean gas which is diverted from its source of supply 11 (Figs. 1 and 2) through branch pipes 16 controlled by dampers 17, to pass through ports 10 and mix with the preheated air entering through ports 9 and burn in the auxiliary chamber 18. The hot gases then pass through a conduit 19 into the top of the recuperator and travel horizontally across and down through the recuperator in zig-zag fashion, being finally drawn out through an exhaust flue 20 at the bottom, the distribution of flow of the heating gases being preferably regulated by dampers 21 (Fig. 1) disposed across the recuperator.

The lean gas coming from source of supply 11, which is used for main heating purposes, passes in through pipes 11ª, having dampers 12 for distribution purposes (Fig. 2) to transverse chambers 13 and 14 having dampers 14ª interposed therebetween, to distribute the flow and from thence into the chamber 8 where the lean gas mixes with the preheated air coming from recuperator 1 above described, and the gases of combustion travel through the main heating chamber 22, which in the present instance is illustrated as for billet heating purposes, until the spent gases finally pass out through an exhaust flue 15 located at the delivery end of the heating chamber.

As above stated the diversion of a portion of the lean gas supply to burn the latter for preheating purposes in auxiliary combustion chamber 18, permits the temperature maintained in the main heating chamber, by combustion of the remainder of the lean gas with the air so preheated, to be much higher than could be obtained by burning the lean gas in the ordinary manner. The various dampers above described also permit the flow of the gas and preheated air to be proportioned between the different purposes for which it is to be used in such manner that uniformly controlled conditions of operation may be maintained. It will also be noted that the described relative disposition of the recuperator, auxiliary chamber and main combustion chamber causes the preheated air to flow past and over the auxiliary combustion chamber, whereby it may take up the heat radiated from the latter.

While a preferred embodiment of the invention has been described it will be obvious that many changes may be made therein without departing from its principles as set forth in the appended claims.

I claim:

1. A furnace of the class described heated by lean gas of the blast furnace gas type, having a main combustion chamber, a conduit adapted to connect the same with a source of such gas supply, an auxiliary combustion chamber also connected with said source, an air preheater laterally spaced from said auxiliary chamber and adapted to be heated by the gases of combustion passing from said auxiliary combustion chamber, preheated air passageways of said preheater leading to the main combustion chamber to mix such preheated air with the gaseous fuel entering said main combustion chamber from said source of supply.

2. A furnace of the class described heated by lean gas of the blast furnace gas type, having a main combustion chamber, a conduit adapted to connect the same with a source of such gas supply, an auxiliary combustion chamber located beneath said main combustion chamber and also communicating with said source of combustible gas, a recuperator also located beneath said main combustion chamber and laterally spaced from said auxiliary combustion chamber together with means for connecting the heating passageways of said recuperator with said auxiliary combustion chamber and the heated gas passageways of said recuperator to the main combustion chamber to mix the preheated gases with the gas entering such main combustion chamber.

3. A furnace of the class described heated by lean gas of the blast furnace gas type, having a main combustion chamber, a conduit adapted to connect the same with a source of such gas supply, an auxiliary combustion chamber also connected with said source, an air preheater laterally spaced from said auxiliary combustion chamber and adapted to be heated by the gases of combustion passing from said auxiliary combustion chamber, preheated air passageways of said preheater leading past said auxiliary combustion chamber so as to take up heat radiated therefrom, and from thence to the main combustion chamber to mix such preheated air with the gaseous fuel entering said main combustion chamber from said source of supply.

4. A furnace of the class described heated by lean gas of the blast furnace gas type having a main combustion chamber, a conduit adapted to connect the same with a source of such gas supply, an auxiliary combustion chamber located beneath said main combustion chamber and also connected with said source, a recuperator also located beneath said main combustion chamber at one side of said auxiliary combustion chamber and connected with said auxiliary combustion chamber to receive the heated gases passing therefrom at the top of the recuperator and discharge said gases from the bottom of the recuperator, said recuperator being constructed to receive the air to be preheated adjacent its bottom and discharge the same from its top into the main combustion chamber adjacent the point of entry of the combustible gas.

5. A furnace of the class described having a main combustion chamber, a conduit adapted to connect the same with a source of combustible gas, an auxiliary combustion chamber also connected with said source, an air preheater adapted to be heated by the gases of combustion passing from said auxiliary combustion chamber, preheated air passageways of said preheater leading to the main combustion chamber to mix such preheated air with the gaseous fuel entering said main combustion chamber from said source of supply, and one or more preheated air passageways of said preheater leading to said auxiliary combustion chamber.

In testimony that I claim the foregoing, I have hereunto set my hand this 20th day of February, 1928.

CHARLES STEIN.